Figure 1:
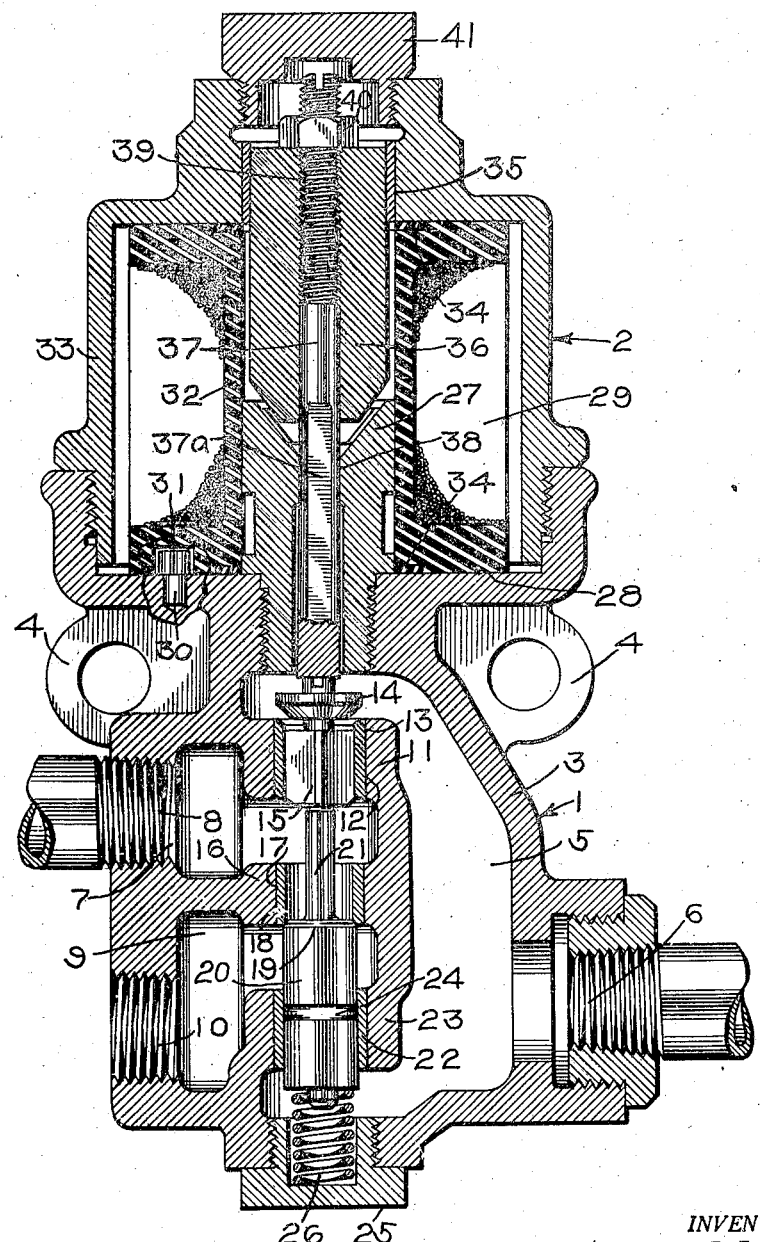

July 23, 1946.  G. T. McCLURE  2,404,514
VALVE DEVICE
Filed Nov. 18, 1944  2 Sheets-Sheet 1

INVENTOR.
Glenn T. McClure
BY  A. L. Vencill
ATTORNEY

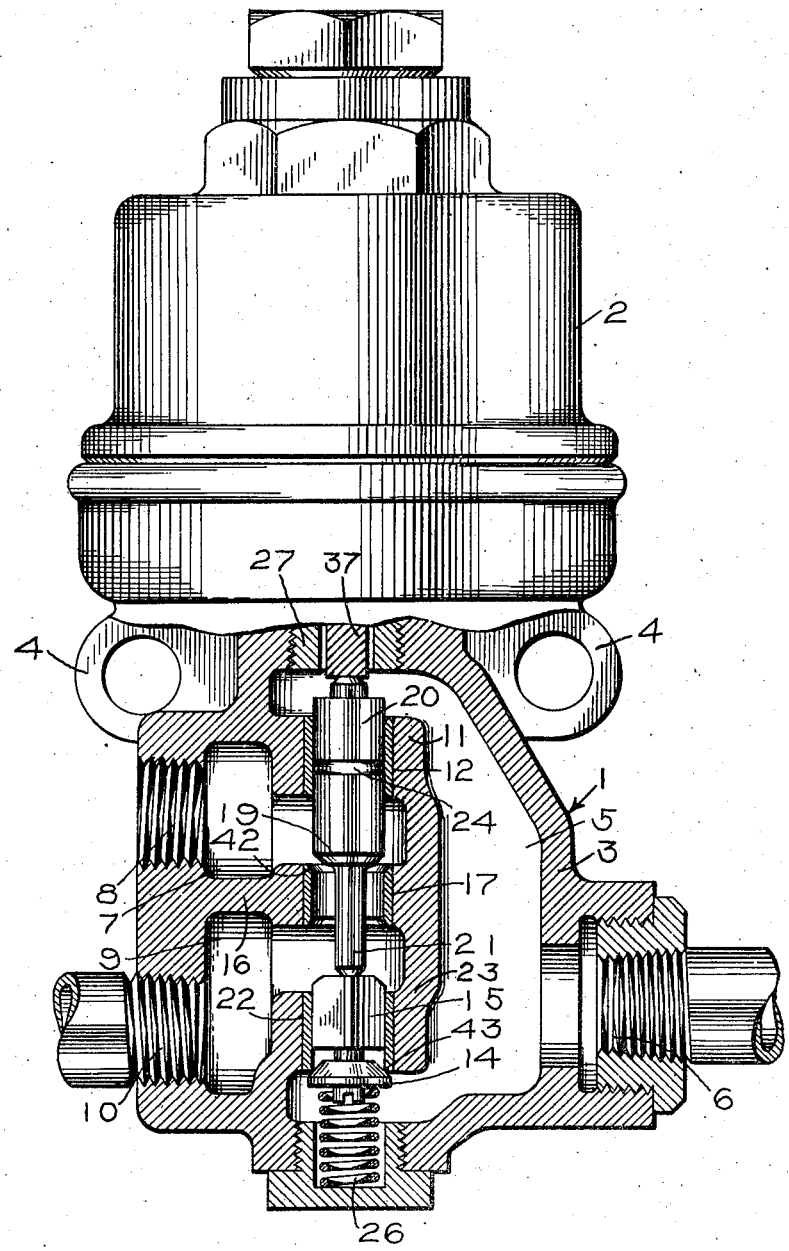

Patented July 23, 1946

2,404,514

UNITED STATES PATENT OFFICE 2,404,514

VALVE DEVICE

Glenn T. McClure, McKeesport, Pa., assignor to The Westinghouse Air Brake Company, Wilmerding, Pa., a corporation of Pennsylvania Application November 18, 1944, Serial No. 564,059

8 Claims. (Cl. 277—21)

This invention relates to valve devices for controlling the flow of fluid under pressure and more particularly to those which are electrically operated and used in conjunction with industrial machinery, fluid pressure brakes and the like.

An object of this invention is to provide an electrically operated valve device which is highly sensitive to a change in the controlling electric circuit.

Another object is to provide an improved electrically operated fluid pressure balanced control valve device.

A further object is to provide an improved electrically operated valve device, the valve portion of which may be readily adapted to operate in response to the making or breaking of either a normally open controlling electric circuit or a normally closed controlling electric circuit.

Still another object is to provide an improved electrically operated valve device in which the operation is unaffected by variations in the pressure of fluid supply or delivery.

Other objects and advantages will appear in the following more detailed description in connection with the accompanying drawings, wherein Fig. 1 is a vertical sectional view of an electrically operated valve device which embodies one form of the invention, the valve mechanism being shown disposed in a certain manner; and Fig. 2 is a combined elevational and sectional view of the valve device illustrating the valve mechanism reversed.

The control valve device, as shown in Fig. 1 of the accompanying drawings, may include a valve portion 1 and a magnet portion 2. The valve portion 1 comprises a casing 3 which is provided with suitable mounting lugs 4. This casing provides a wall structure which defines supply chamber 5 which may be connected by way of a passage 6 to a suitable fluid pressure supply source (not shown) and also defines a delivery chamber 7 which may, when the parts are assembled as shown in Fig. 1, be connected by way of a passage 8 to a device (not shown) to be operated by fluid under pressure. The wall structure also defines an exhaust chamber 9 which may be open by way of a passage 10 to atmosphere when the parts are assembled as shown in Fig. 1.

Integral with the casing 3, and serving to separate the chamber 5 from the chamber 7, is a wall 11, through an enlarged portion of which there extends a bore having a bushing 12 pressed therein. The upper end of this bushing 12 is provided with a valve seat 13 for making sealing engagement with a tapered valve 14 which, as will hereinafter more fully appear, controls the flow of fluid under pressure from the supply chamber 5 to the delivery chamber 7. A fluted stem 15 of this valve 14 is slidably guided in the bushing 12.

Integral with the wall 11 and the casing 3 so as to define the delivery chamber 7 and to separate that chamber from the exhaust chamber 9 is a wall 16 having a bore with a bushing 17 pressed therein in spaced axial relationship with the bushing 12. The lower end of this bushing 17 is provided with a valve seat 18 upon which the valve 19 of a valve member 20 is adapted to seat for closing communication between chambers 7 and 9. A stem 21 of the valve member 20 extends through the bushing 17 and chamber 7 into abutting relationship with the bottom of the stem 15 of the valve 14.

The valve member 20 is slidably mounted in a bushing 22 pressed into an enlarged portion of a wall 23, which wall is integral with the casing 3 and the walls 11, 16 and 23 and serves to separate chamber 9 from chamber 5. Retained in an annular groove in the valve member 20 is a sealing ring 24 which presses against the walls of said groove and the inner surface of the bushing to prevent leakage of fluid under pressure from chamber 5 to chamber 9, which chamber 9, with the valve mechanism arranged as shown in Fig. 1, is open to atmosphere. Contained in chamber 5, and interposed between and engaging a cap nut 25 in the bottom of said chamber and the bottom of the valve member 20, is a spring 26 which urges valves 19 and 14 towards the position in which they are shown in Fig. 1.

Thus, it will be apparent that the supply chamber 5 may communicate by way of a valve controlled passage in wall 11 with the delivery chamber 7; and that the passage in wall 23 between chamber 5 and exhaust chamber 9 is closed off by the valve member 20 and the sealing ring 24.

It should be noted that the bushings 12 and 22 open to the chamber 5 in opposite directions and it is highly desirable that the areas of the openings in said bushings and in bushing 17 be as nearly as possible the same size for reasons to be explained later, but it will be understood that the inside diameter of the bushing 17 will be slightly less than the inside diameter of bushings 12 and 22 so as to provide for a valve seat at either end of the bushing.

Also, it should be understood that the distance from the lower end of the bushing 17 to the upper end of the bushing 12 is substantially equal to the distance from the upper end of the bushing 17 to the lower end of the bushing 22, in order to permit a reversing of the valve mechanism as will appear later in connection with the description of Fig. 2 of the drawings. That is to say, the distance between the remote ends of the bushings 17 and 12 is equal to the distance between the remote ends of bushings 17 and 22.

The magnet portion 2 comprises a core 27 which is centrally mounted by screw-thread means in an annular top portion 28 of the casing 3. The magnetic portion 2 also comprises a coil 29 arranged to be mounted over the core 27, which core is prevented from rotating during assembly by a dowel pin 30 secured to the portion 28 and projecting upwardly from the top surface thereof, the projecting portion of the pin extending into an opening 31 in a spool 32 for the coil 29.

The coil 29 is inclosed by a cap portion 33 which has screw-threaded engagement with the casing 3. This cap portion acts through the medium of gaskets 34 to hold the coil 29 firmly against the upper surface of the portion 28 of the casing. A bushing 35 is provided in an axial bore in the top of the cap portion 33, in which bushing an armature 36 is slidably guided for reciprocatory movement upon the energization and deenergization of the coil 29.

The armature 36 is provided with a stem 37 which is slidably guided in an axial bore 38 in the core 27, which stem extends downwardly through the core and into abutting engagement with the top of valve 14 in chamber 5. Screw-thread means 39 having a check nut 40 are provided in the top of the armature 36 for effecting the necessary adjustments. The stem 37 is provided with one or more flattened portions 37a which extends from the lower end of the stem to a point located slightly above the lower face of the armature 36, thus providing a communication between the chamber 5 and the space between the lower face of the armature and the adjacent upper face of the core 27. It should here be mentioned that air supplied to this space flows around the core to the space above the upper end face thereof thus substantially balancing the core at all times. A cap nut 41 is provided in the cap portion 33 which may be removed when it is desired to effect armature adjustment just mentioned.

With the control valve device in the position in which it is shown in Fig. 1, fluid under pressure flows by way of passage 6 from a supply source, not shown, to the chamber 5, past valve 14 and fluted stem 15 to chamber 7 and thence by way of passage 8 to the device (not shown) to be operated by fluid under pressure. The valve 19 being in engagement with seat 18, communication of chamber 7 with the atmospheric chamber 9 is closed off.

When the coil 29 of the magnet portions 2 is energized by an electric current, armature 36 will move downwardly under the influence of the electromagnetic field thus set up and act through the medium of the stem 37 to seat the valve 14, thereby interrupting the flow of fluid under pressure from chamber 5 to chamber 7.

Downward movement of the valve 14 acting through the medium of its fluted stem 15 and stem 21 of the valve member 20 causes the valve 19 to unseat, thus permitting fluid under pressure in chamber 7, and consequently in the fluid pressure operated device connected to chamber 7 by way of passage 8, to flow through the bushing 17, past valve 19 into chamber 9 which is connected by passage 10 to atmosphere.

As previously noted, the areas of the openings in the bushings 17 and 22 are as nearly as possible equal and, since the pressure of fluid in chamber 5 acting upwardly on the bottom of the valve member 20 will be the same as the pressure of fluid in chamber 7 acting downwardly on the valve member 20, the only forces to be overcome by the armature 36 of the magnet portion 2 is that of the spring 26 and friction, which will be relatively small. It will thus be seen that an electromagnetic control valve device is provided which can operate over a wide range of current supplies and regardless of the pressure in the chambers 5 and 7.

Also, as previously noted, the areas of the openings in bushings 12 and 22 are equal so that with valve 14 seated, the under side of said valve and the upper side of valve portion 20 will be open to atmsophere and the pressure of fluid in chamber 5 acting in a downwardly direction on valve 14 will be counterbalanced by the same fluid pressure acting in an upwardly direction over the same area on the valve portion 20. When the electric circuit is opened, the spring 26 will act to promptly return the valves 14 and 19 to the position in which they are shown in Fig. 1.

In some instances it will be more desirable to have the valves operate in a manner just the reverse of that described. That is to say, fluid under pressure will be supplied to the device to be operated when the electric circuit is closed and fluid under pressure will be vented from the device to be operated when the circuit is opened. For this purpose the valve assemblage is merely reversed and the proper seats provided therefor as will now appear.

Referring now to Fig. 2, the same parts, bearing the reference numerals corresponding to the same parts in Fig. 1, are shown disposed in a manner to obtain this result. Now, however, chamber 7 will be in constant open communication with the atmosphere by way of passage 8 while chamber 9 will be in communication by way of passage 10 with the device to be operated by fluid under pressure. The valve member 20 is slidably guided in the bushing 12. The upper end of the bushing 17 has been provided with a valve seat 42 for cooperation with the valve 19 of the valve member 20. The valve 14 is slidably guided in the bushing 22 by means of the fluted stem 15 which is held in abutting engagement with the stem 21 of the valve member 20 by the force of the spring 26. The lower end of the bushing 22 has been provided with a valve seat 43 for cooperation with the valve 14.

With the circuit through the magnet portion 2 open, the valves will be in the position in which they are shown in Fig. 2. Fluid under pressure will flow from chamber 9, and consequently from the device to be operated to chamber 9 by way of passage 10, through the bushing 17, past valve 19 to chamber 7, and thence by way of passage 8 to atmosphere. The pressure of fluid in chamber 5 will exert a downwardly directed force on valve member 20 which will counterbalance the fluid pressure in chamber 5 acting on the valve 14.

When the circuit through the magnet portion 2 is closed, valve member 20 will be actuated downwardly thereby against the pressure of spring 26 until valve 19 engages valve seat 42 closing communication between delivery chamber 9 and atmospheric chamber 7. At the same time, valve member 20 will act through the medium of its stem 21 and the fluted stem 15 of the valve 14 to unseat valve 14 thereby permitting fluid under pressure in chamber 5 to flow past valve 14, through bushing 22 to delivery chamber 9, and thence by way of passage 10 to a device to be operated by fluid under pressure.

It will be noted that the pressure of fluid in chamber 5, acting in a downwardly direction on valve member 20, will now counterbalance the pressure of fluid in chamber 9, which is now the same as that in chamber 5, acting in an upwardly direction over an equal area of the valve member 20. Thus, when the circuit through the magnet portion 2 is opened, the spring 26 will be able to act promptly in moving the valves to the position in which they are shown in Fig. 2.

Having now described my invention, what I claim as new and desire to secure by Letters Patent, is:

1. A valve device comprising a casing having a wall structure defining a first chamber, a second chamber and a third chamber, said wall structure having passages through which communications between certain of said chambers may be established and disestablished, a valve mechanism disposed in said wall structure and operative for establishing and disestablishing said communication, said valve mechanism when disposed in said wall structure in a certain manner being operable to control a communication between the first and second chambers and to maintain closed a passage between the first and third chambers, and when disposed in said wall structure in a reverse manner being operable to control a communication between the first and third chambers and to maintain closed the passage between said first and second chambers, and means for effecting the operation of said valve mechanism.

2. A valve device comprising a casing having a wall structure defining a first chamber, a second chamber and a third chamber, said wall structure having passages through which communications between certain of said chambers may be established and disestablished, a valve mechanism disposed in said wall structure for establishing and disestablishing said communications, said valve mechanism when disposed in said wall structure in a certain manner being operable to control a communication between the first and second chambers and also plugging communication between the first and third chambers and when disposed in said wall structure in a reverse manner being operable to control a communication between the first and third chambers and also plugging communication between the first and second chambers, and means for effecting the operation of said valve mechanism.

3. A valve device comprising a casing having a wall structure defining a first chamber, a second chamber and a third chamber, said wall structure having passages through which communications between certain of said chambers may be established or disestablished, a valve mechanism disposed in said wall structure for establishing and disestablishing said communications, said valve mechanism when disposed in said wall structure in a certain manner being operable to control a communication between the first and second chambers and to control in a particular way a communication between the second and third chambers and when disposed in said wall structure in a reverse manner being operable to control a communication between the first and third chambers and to control in a way opposite to said particular way said communication between the second and third chambers and means for effecting the operation of said valve mechanism.

4. A valve device comprising a casing having a wall structure defining a first chamber, a second chamber and a third chamber, said wall structure having passages through which communications between certain of said chambers may be established and disestablished, a valve mechanism disposed in said wall structure for establishing and disestablishing said communications, said valve mechanism when disposed in said wall structure in a certain manner plugging communication between the first and third chambers and being operable to control a communication between the first and second chambers and a communication between the second and third chambers so as to open one communication while closing the other and when disposed in said wall structure in a reverse manner plugging communication between the first and second chambers and being operable to control said communication between the second and third chambers in the opposite way and a communication between the first and third chambers so as to open one of the two last mentioned communications while closing the other, and means for effecting the operation of said valve mechanism.

5. A valve device comprising a casing having a supply chamber, a wall structure within said casing defining and separating a delivery chamber and an exhaust chamber, said wall structure being so formed as to separate the delivery and exhaust chambers from said supply chamber, three axially aligned passages in said wall structure, the first passage leading from said supply chamber to said delivery chamber, the second passage leading from said delivery chamber to said exhaust chamber, and the third passage leading from said supply chamber to said exhaust chamber, valve means movable as a unit comprising a valve for each of the first two passages named and operable to open one of these two passages when closing the other, said valve means further comprising a plunger with means for slidably sealing said plunger within said third passage which plunger is subject at all times to the pressure of fluid in said supply chamber so that the pressure of fluid acting on either valve when seated is counterbalanced, and means for operating said valve means.

6. A valve device comprising a casing having a supply chamber, a wall structure within said casing defining and separating a delivery chamber and an exhaust chamber, said wall structure being so formed as to separate the delivery and exhaust chambers from said supply chamber, three axially aligned passages in said wall structure, the first passage leading from the supply chamber to the delivery chamber, the second passage leading from the delivery chamber to the exhaust chamber, and the third passage leading from the supply chamber to the exhaust chamber, the distance from the outer end of said first passage to that end of the second passage more remote therefrom being equal to the distance from the outer end of said third passage to the other end of said second passage, valve means in said passages effective in one position to open communication between the supply chamber and the delivery chamber while closing communication between the delivery chamber and the exhaust chamber and effective in another position to open communication between the delivery chamber and the exhaust chamber and to close communication between the supply chamber and the delivery chamber said valve means having a portion closing at all times, communication between the supply chamber and exhaust chamber, and means for operating said valve means from one position to the other position.

7. A valve device comprising a casing having a supply chamber, a wall structure within said casing defining and separating a delivery chamber and an exhaust chamber, said wall structure being so formed as to separate the delivery and exhaust chambers from said supply chamber, three axially aligned passages in said wall structure, the first passage leading from the supply chamber to the delivery chamber, the second passage leading from the delivery chamber to the exhaust chamber, and the third passage leading from the supply chamber to the exhaust chamber, the distance from the outer end of said first passage to the end more remote therefrom of said second passage being substantially equal to the distance from the outer end of said third passage to the end more remote therefrom of said second passage, valve means operative to open one of the first two passages while closing the other, means included in the valve means for maintaining the third passage closed and being subject to the pressure of fluid in said supply chamber, so as to substantially counterbalance either the pressure of fluid in said delivery chamber as in said supply chamber acting on said valve means, and means for operating said valve means.

8. A valve device comprising a casing having a wall structure defining a first chamber, a second chamber and a third chamber, said wall structure having passages through which communications between certain of said chambers may be established and disestablished, a valve mechanism disposed in said wall structure and operative for establishing and disestablishing said communications, said valve mechanism when disposed in said wall structure in a certain manner being operable to control a communication between the first and second chambers and to maintain closed a passage between the first and third chambers, and when disposed in said wall structure in a reverse manner being operable to control a communication between the first and third chambers and to maintain closed the passage between said first and second chambers, said valve mechanism being at all times substantially balanced by the fluid pressure acting thereon in opposite directions endwise.

GLENN T. McCLURE.